United States Patent
Jo

(10) Patent No.: US 8,692,872 B2
(45) Date of Patent: Apr. 8, 2014

(54) 3D GLASSES, METHOD FOR DRIVING 3D GLASSES, AND SYSTEM FOR PROVIDING 3D IMAGE

(75) Inventor: Chan-young Jo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 390 days.

(21) Appl. No.: 13/028,241

(22) Filed: Feb. 16, 2011

(65) Prior Publication Data

US 2012/0038756 A1 Feb. 16, 2012

(30) Foreign Application Priority Data

Aug. 13, 2010 (KR) .................. 10-2010-0078295

(51) Int. Cl.
*H04N 13/04* (2006.01)
(52) U.S. Cl.
USPC ............. 348/56; 348/42; 348/43; 348/46; 348/51; 348/53; 348/54; 348/55; 345/419; 382/168; 382/169; 382/170; 382/171; 382/172
(58) Field of Classification Search
USPC ............. 348/54, 55, 56, 42, 43, 46, 51, 53; 382/168, 169, 170, 171, 172; 345/419
See application file for complete search history.

(56) References Cited

U.S. PATENT DOCUMENTS

| | | | | | |
|---|---|---|---|---|---|
| 6,111,596 | A | * | 8/2000 | Haskell et al. | 348/42 |
| 6,678,091 | B2 | * | 1/2004 | Tropper | 359/462 |
| 2011/0001807 | A1 | * | 1/2011 | Myokan | 348/56 |
| 2011/0007136 | A1 | * | 1/2011 | Miura et al. | 348/46 |
| 2012/0038744 | A1 | * | 2/2012 | Naka | 348/43 |
| 2012/0120208 | A1 | * | 5/2012 | Mao | 348/54 |
| 2012/0147157 | A1 | * | 6/2012 | Wu et al. | 348/56 |

OTHER PUBLICATIONS

Mao, Xiaodong. U.S. Appl. No. 61/414,871, filed Nov. 17, 2010.*

* cited by examiner

*Primary Examiner* — Christopher S Kelley
*Assistant Examiner* — Zhihan Zhou
(74) *Attorney, Agent, or Firm* — Sughrue Mion, PLLC

(57) ABSTRACT

Three-dimensional (3D) glasses, a method for driving 3D glasses, and a system for providing a 3D image are provided. The 3D glasses driving method includes detecting a first pattern corresponding to a left eye image and a second pattern corresponding to a right eye image from a 3D display apparatus, converting the first pattern into a first histogram and the second pattern into a second histogram, comparing the converted first and second histograms with first and second optimal histograms, and adjusting an opening or a closing of a left eye glasses part and a right eye glasses part of the 3D glasses based on the comparison.

15 Claims, 6 Drawing Sheets

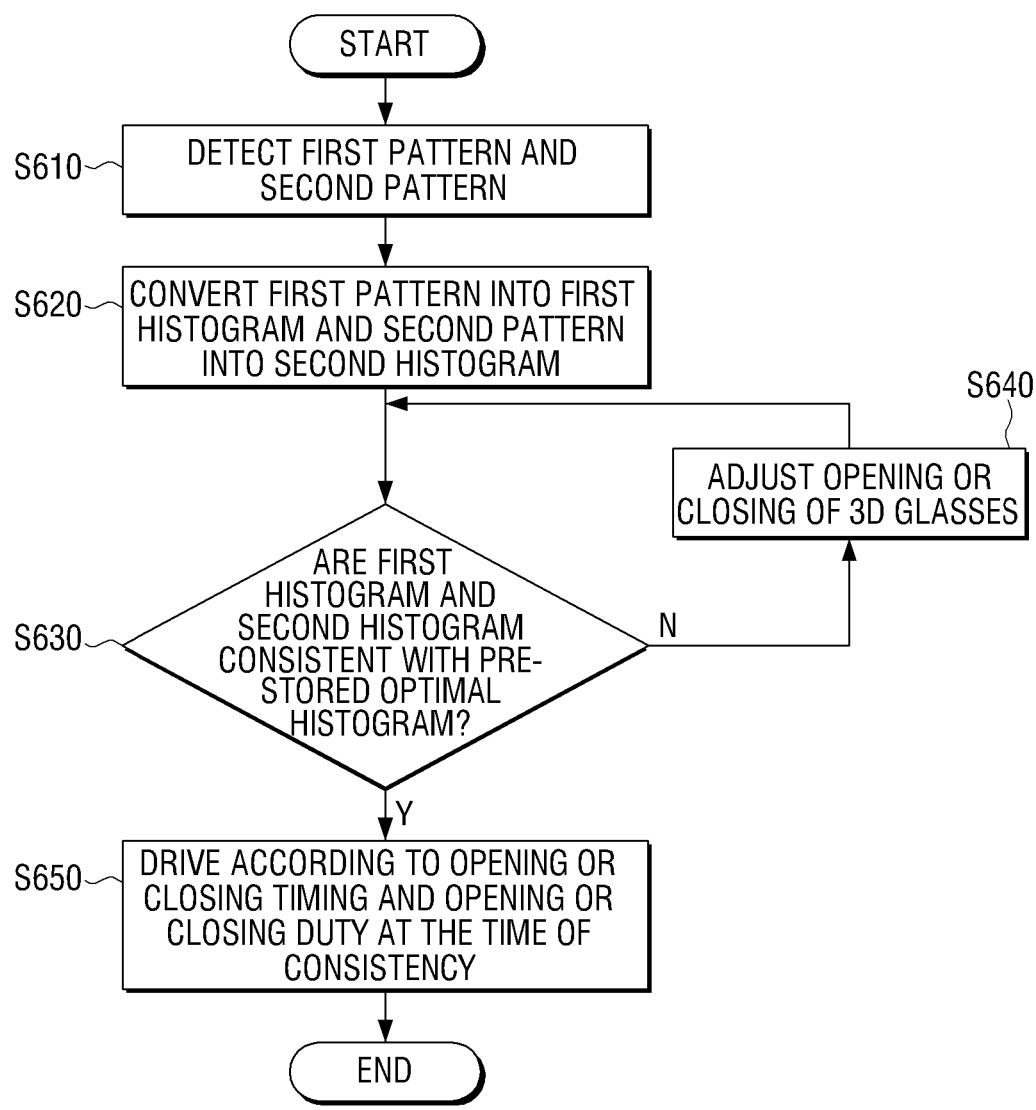

3D GLASSES, METHOD FOR DRIVING 3D GLASSES, AND SYSTEM FOR PROVIDING 3D IMAGE

CROSS-REFERENCE TO RELATED APPLICATIONS

This application claims priority from Korean Patent Application No. 2010-0078295, filed in the Korean Intellectual Property Office on Aug. 13, 2010, the disclosure of which is incorporated herein by reference.

BACKGROUND OF THE INVENTION

1. Field

Apparatuses and methods consistent with exemplary embodiments relate to three-dimensional (3D) glasses, a method for driving 3D glasses and a system for providing a 3D image, and more particularly, to 3D glasses for viewing a 3D image in which left eye image and right eye image are displayed alternately, a method for driving 3D glasses and a system for providing a 3D image.

2. Description of the Related Art 3D stereoscopic image technology is applicable to various fields such as information communication, broadcasting, medicine, education & training, military, games, animation, virtual reality, computer-aided design (CAD), and industrial technology, and is regarded as a core base technology for the next generation 3D stereoscopic multimedia information communication, which is utilized in all the aforementioned fields.

Generally, a stereoscopic sense that a person perceives occurs from a complex effect due to a degree of change of thickness of the person's eye lens according to the location of an object being perceived, a difference in the angle of the object as perceived by both eyes, differences in location and shape of the object as perceived by both eyes, a disparity due to a movement of the object, and various other psychological and memory effects.

In particular, binocular disparity, caused by an approximate 6~7 cm lateral distance between the person's left eye and right eye, can be regarded as the main cause of the stereoscopic sense. Due to binocular disparity, the person perceives the object at different angles, which makes the left eye and the right eye receive different images, and when these two images are transmitted to the person's brain through the retinas, the brain can perceive the original 3D stereoscopic image by combining the two pieces of information exactly.

There are two types of stereoscopic image display apparatuses: glasses-type apparatuses which use special glasses, and nonglasses-type apparatuses which do not use such special glasses. A glasses-type apparatus may use a color filtering method which separates the images received by the left eye and the right eye by using color filters of complementary colors, a polarized filtering method which separates the images using a light-shading effect caused by a combination of polarized light elements meeting at right angles, or a shutter glasses method which enables a person to perceive a stereoscopic sense by alternately blocking the left eye and the right eye in response to a sync signal coordinated with the projection of a left eye image and a right eye image on a screen.

In a related art shutter glasses method, a sync signal is employed to synchronize left and right eye shutters with the display of a left image and a right image. However, the left eye image and the right eye image are not exactly synchronized with the glasses in terms of the timing of opening or closing the shutters and the time during which the shutters are opened or closed and thus, cross-talk and degradation of resolution and the stereoscopic sense may occur.

In addition, a sync signal frequently causes errors or cross-talk due to external light, external electromagnetic waves, or noises in a display apparatus itself.

Furthermore, operating a sync signal requires a circuit and an apparatus configuration unit. Moreover, if a plurality of viewers are out of the range of a sync signal, 3D effect may not be achieved in many occasions.

Accordingly, a method for allowing a user to watch a 3D image without a sync signal is required.

SUMMARY OF THE INVENTION

One or more exemplary embodiments provide a method for driving 3D glasses by detecting a first pattern corresponding to a left eye image and a second pattern corresponding to a right eye image from a 3D display apparatus, converting the first pattern and the second pattern into a first histogram and a second histogram respectively, comparing the converted first and second histograms with pre-stored histograms respectively, and adjusting opening or closing of left eye glasses and right eye glasses of 3D glasses, 3D glasses, and a system for providing a 3D image.

According to an aspect of an exemplary embodiment, there is provided a method for driving 3D glasses which is linked to a display apparatus, including: detecting a first pattern corresponding to a left eye image and a second pattern corresponding to a right eye image from the 3D display apparatus, converting the first pattern into a first histogram and the second pattern into a second histogram, comparing the converted first and second histograms with first and second optimal histograms, and adjusting an opening or a closing of a left eye glasses part and a right eye glasses part of the 3D glasses using the comparison result.

The detecting may include detecting the first pattern and the second pattern using a photo detector disposed in the left eye glasses part and a photo detector disposed in the right eye glasses part of the 3D glasses.

The first and the second patterns may be detected when the 3D display apparatus or the 3D glasses are turned on, when a user command is received, or when a predetermined time period elapses.

The pre-stored histogram may be a histogram which is measured when the display operation of a left eye image and a right eye image of the 3D display apparatus is synchronized with an opening or a closing operation of the left eye glasses part and the right eye glasses part of the 3D glasses.

The adjusting may comprise adjusting at least one of an opening or a closing timing and an opening or a closing duty cycle of the 3D glasses unit until the first histogram and the second histogram are consistent with the optimal first and second histograms.

The method may further include, if the first histogram and the second histogram become consistent with the first and second optimal histograms, driving the 3D glasses according to one of the opening or a closing timing and an opening or a closing duty cycle at the time at which the histograms become consistent.

The first and the second patterns may be geometric patterns which are different from each other.

The first and the second histograms may be data which is created as the first and the second patterns are converted into a digital signals.

According to an aspect of another exemplary embodiment, there are provided 3D glasses which are linked to a 3D display apparatus, including: a detecting unit which detects a first pattern corresponding to a left eye image and a second pattern corresponding to a right eye image from the 3D display apparatus, a converting unit which converts the first pattern into a first histogram and the second pattern into a second histogram, and a controller which compares the converted first and second histograms with optimal first and second histograms and adjusts an opening or a closing of a left eye glasses part and a right eye glasses part of the 3D glasses using the comparison result.

The detecting unit may be a photo detector.

The first and the second patterns may be detected in at least one of when the 3D display apparatus or the 3D glasses are turned on, when a user command is received, and when a predetermined time period elapses.

The optimal histograms may be histograms that are measured when the display operation of the left eye image and the right eye image of the 3D display apparatus is synchronized with an opening or a closing operation of the left eye glasses part and the right eye glasses part of the 3D glasses.

The controller may adjust at least one of an opening or a closing timing and an opening or a closing duty cycle of the 3D glasses unit until the first histogram and the second histogram are consistent with the optimal histograms.

The controller, if the first histogram and the second histogram become consistent with the optimal histograms, may drive 3D glasses according to one of the opening or the closing timing and the opening or the closing duty at the time at which the histograms become consistent with each other.

The first and the second patterns may be geometric patterns which are different from each other.

The first and the second histograms may be data which is created as the first and the second patterns are converted into digital signals.

According to an aspect of another exemplary embodiment, there is provided a system for providing a 3D image, including: a 3D display apparatus which displays a first pattern corresponding to a left eye image and a second pattern corresponding to a right eye image, and 3D glasses which detect the first and the second patterns displayed on the 3D display apparatus, convert the first pattern into a first histogram and the second pattern into a second histogram, compare the converted first and second histograms with first and second optimal histograms respectively, and adjust an opening or a closing of a left eye glasses part and a right eye glasses part of the 3D glasses using the comparison result.

BRIEF DESCRIPTION OF THE DRAWINGS

The above and/or other aspects will be more apparent from the following description of exemplary embodiments with reference to the accompanying drawings, in which:

FIG. 6 is a flowchart to explain a method for driving 3D glasses according to an exemplary embodiment.

DETAILED DESCRIPTION

Figure 1:
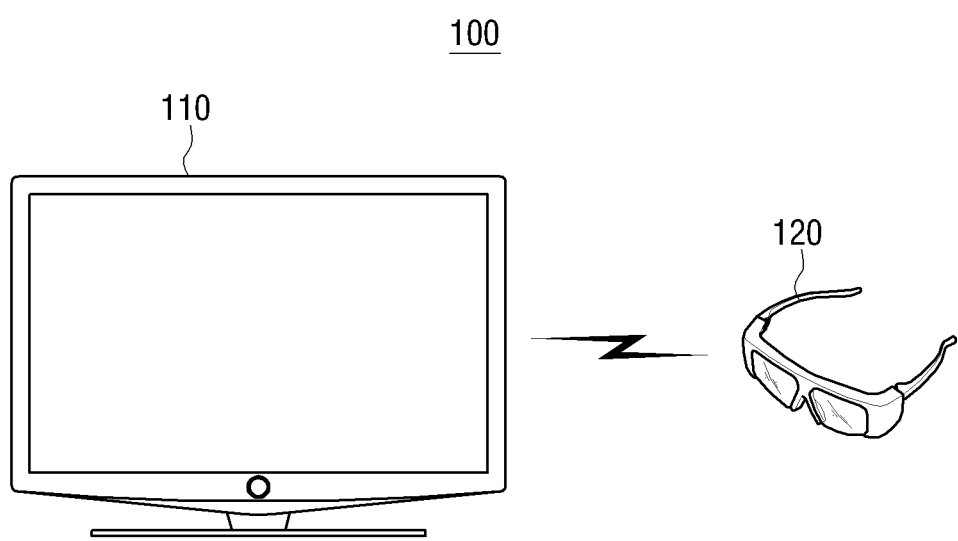
FIG. 1 is a view illustrating a system for providing a 3D image according an exemplary embodiment.

Certain exemplary embodiments are described in higher detail below with reference to the accompanying drawings.

In the following description, like drawing reference numerals are used for like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view illustrating a 3D image providing system 100 according an exemplary embodiment. As illustrated in FIG. 1, the 3D image providing system 100 comprises a 3D TV 100 for displaying a 3D image on a screen and 3D glasses 120 for viewing a 3D image.

The 3D TV 110 is a type of display apparatus, which receives a 3D image directly from a photographing apparatus such as a camera, or from a broadcasting station to which the 3D image has been transmitted to after editing/processing, processes the 3D image, and displays it on the screen. In particular, the 3D TV 110 processes a left eye image and a right eye image taking into account the format of the 3D image, and enables the processed left eye image and the right eye image to be displayed alternately in a timesharing manner.

Not only that, the 3D TV 110 also generates a first pattern and a second pattern, synchronized with the timing of the display of the left eye image and the right eye image. That is, the 3D TV 100 generates and alternately displays the first pattern and the second pattern so that the timing at which the left eye shutter and the right eye shutter of the 3D glasses 120 are opened or closed is synchronized with the display of the first pattern and the second pattern which corresponds to the timing at which the left eye image and the right eye image will be displayed on the 3D TV 110.

Figure 2:
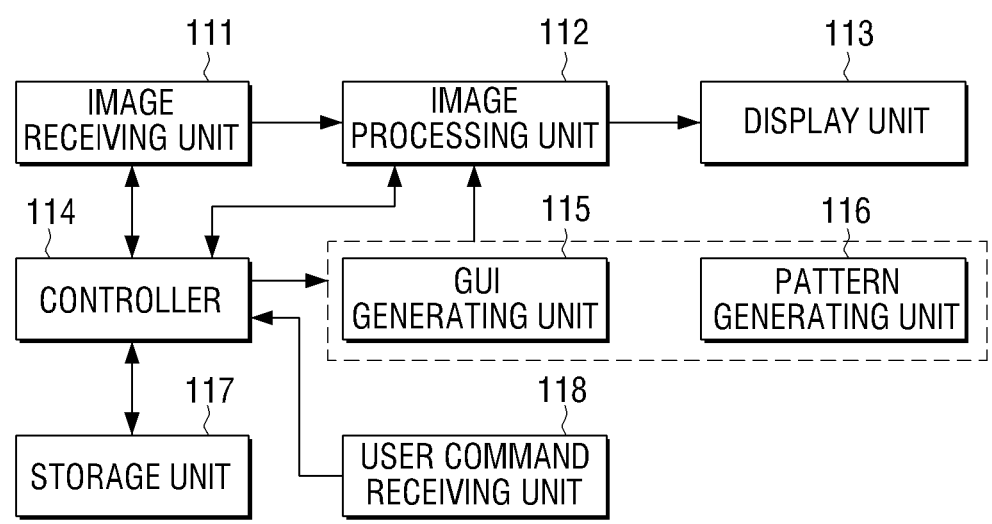
FIG. 2 is a block diagram illustrating a 3D TV according to an exemplary embodiment.

The detailed configuration of the 3D TV 110 will be explained with reference to FIG. 2. FIG. 2 is a block diagram illustrating the 3D TV 110 according to an exemplary embodiment.

As illustrated in FIG. 2, the 3D TV 110 comprises an image receiving unit 111, an image processing unit 112, a display unit 113, a controller 114, a graphic user interface (GUI) generating unit 115, a pattern generating unit 116, a storage unit 117, and a user command receiving unit 118.

The image receiving unit 111 receives a broadcast transmitted wirelessly or via cables from a broadcasting station or a satellite, and demodulates the broadcast. The image receiving unit 111 may also be connected to an external device such as a camera, and receive a 3D image from it, or may be connected wirelessly or via cables through an interface such as a Separate Video (S-Video) cable, a component cable, a composite cable, a D-subminiature (D-Sub) cable, a digital visual interface (DVI) cable, a High-Definition Multimedia Interface (HDMI™) cable, or the like.

In this case, the 3D image is an image which consists of at least one frame, such that both a left eye image and a right eye image may be included in a single image frame, or each frame includes one of a left eye image and a right eye image.

In addition, the 3D image transmitted to the image receiving unit 111 may be in various formats. Specifically, it can be in a format according to a general frame sequence method, a top-bottom method, a side by side method, a horizontal interleave method, a vertical interleave method, or a checker board method.

The image receiving unit 111 transmits the received 3D image to the image processing unit 112.

The image processing unit 112 performs operations of processing signals and adding GUIs, including video decoding, format analyzing, and video scaling of the received 3D image.

In particular, the image processing unit 112 generates a left eye image and a right eye image, each of which fits the size of a screen (e.g., 1920*1080), using the format of the 3D image transmitted to the image receiving unit 111.

That is, if the format of the 3D image is formatted according to a top-bottom method, a side by side method, a horizontal interleave method, a vertical interleave method, or a checker board method, the image processing unit 112 extracts a left eye image part and a right eye image part from each image frame and performs scaling or interpolation on the extracted left eye image and the right eye image so as to generate a left eye image and a right eye image which will be provided to a user.

Alternatively, if the 3D image is formatted according to a general frame sequence method, the image processing unit 112 extracts a left eye image or a right eye image from each frame to provide them to a user.

In addition, the image processing unit 112 enables a GUI received from the GUI generating unit 115, which will be explained below, to be added to either of or both the left eye image and right eye image.

The image processing unit 112 transmits the extracted left eye image and the right eye image alternately in a timesharing manner to the display unit 113. In other words, the image processing unit 112 transmits the left eye image and the right image to the display unit 113 in the order of 'left eye image (L1)→right eye image (R1)→left eye image (L2)→right eye image (R2)→ . . . '.

In addition, the image processing unit 112 also transmits to the display unit 113 the first pattern corresponding to the left eye image and the second pattern corresponding to the right eye image, received from the pattern generating unit 116 which will be explained later.

The display unit 113 alternately outputs the left eye image and the right eye image from the image processing unit 112 and provides the images to a user.

The GUI generating unit 115 generates a GUI to be displayed on a display. The GUI generated by the GUI generating unit 115 is transmitted to the image processing unit 112 and is added to either or both of the left eye image and the right eye image to be displayed on the display.

The pattern generating unit 116 generates the first pattern corresponding to the left eye image and the second pattern corresponding to the right eye image. In this case, the first pattern and the second pattern are geometrically different. For example, the first pattern may include a quadrangle shape, and the second pattern may include a circle shape. However, the shapes of the first and second patterns are not limited thereto, and the technical feature described herein may be applied when the first and second patterns include other shapes.

The storage unit 117 is a storage medium in which the various programs needed to operate the 3D TV 110 are stored. The storage unit 117 can be a Hard Disk Drive (HDD) or other memory.

The user command receiving unit 118 receives a user command from an input means such as a remote controller and transmits it to the controller 114.

The controller 114 controls the overall operations of the 3D TV 110 according to the user command received from the user command receiving unit 118.

In particular, the controller 114 controls the image receiving unit 111 and the image processing unit 112, so that the 3D image can be received, the received 3D image can be separated into the left eye image and the right eye image, and each of the separated left eye image and the right eye image can be scaled or interpolated to fit one screen.

Furthermore, the controller 114 controls the pattern generating unit 116 to generate the first pattern and the second pattern, corresponding to the left eye image and the right eye image respectively. After the first pattern corresponding to the left eye image and the second pattern corresponding to the right eye image are generated, the controller 114 controls the first pattern to be output at the time when the left eye image would be output and the second pattern to be output at the time when the right eye image would be output. That is, the controller 114 controls the image processing unit 112 to coordinate the timing of the display of the left eye image and the right eye image with a timing of the display of the first and the second patterns.

Herein, the first and the second patterns are output for a predetermined period of time in at least one of the cases when the 3D TV 110 or the 3D glasses 120 are turned on, when a user command is input, and when a predetermined time period elapses.

Referring back to FIG. 1, the 3D glasses 120 open or close the left eye shutter and the right eye shutter alternately according to the timing of the first and the second patterns output from the 3D TV 110 so that a user may watch the left eye image and the right eye image through the left eye and the right eye respectively. Hereinafter, the detailed configuration of the 3D glasses 120 will be explained with reference to FIG. 3.

Figure 3:
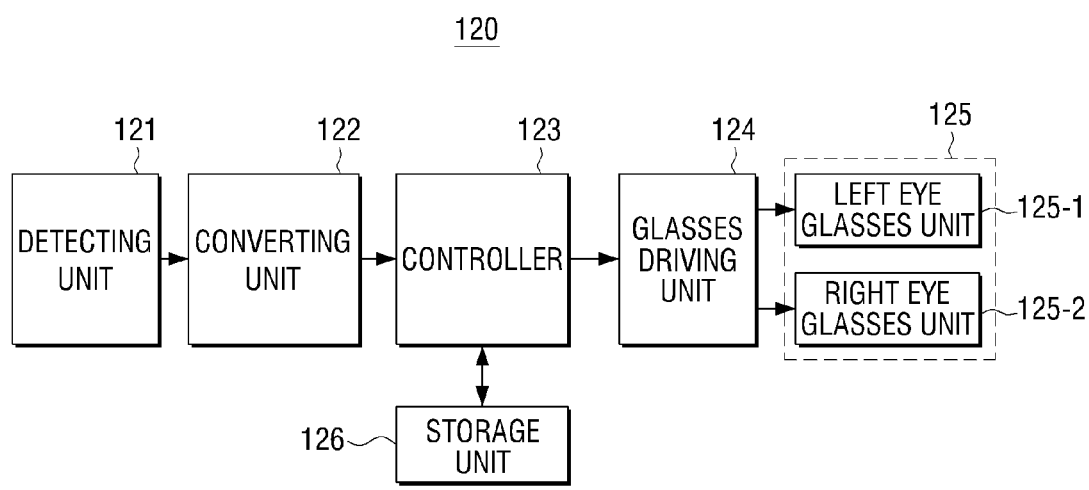
FIG. 3 is a block diagram illustrating 3D glasses according to an exemplary embodiment.

FIG. 3 is a block diagram illustrating the 3D glasses 120 according to an exemplary embodiment. As illustrated in FIG. 3, the 3D glasses 120 comprise a detecting unit 121, a converting unit 122, a controller 123, a glasses driving unit 124, a glasses unit 125, and a storage unit 126.

The detecting unit 121 detects the first and the second patterns output from the 3D TV 110. As described above, the detected first and second patterns are synchronized with a timing of the left eye image and the right eye image of a 3D image to be displayed on the 3D TV 110 and have different geometric patterns.

In this case, the detecting unit 121 may be a photo detector for detecting the optical properties of the first and the second patterns.

In addition, two detecting units 121 may be formed at the back of a left eye portion and a right eye portion of the 3D glasses 120, respectively. In this case, the detecting unit 121 at the back of the left eye portion detects the first pattern corresponding to the left eye image, and the detecting unit 121 at the back of the right eye portion detects the second pattern corresponding to the right eye image.

In addition, the detecting unit 121 may detect the first pattern and the second pattern from the 3D TV 110 in at least one of the cases when the 3D TV 110 or the 3D glasses 120 are turned on, when a user command is input, and when a predetermined time period arrives. Specifically, the detecting unit 121 may detect the first and the second patterns for a predetermined period of time before a 3D image is displayed, or after the 3D TV 110 or the 3D glasses 120 are turned on. In addition, the detecting unit 121 may detect the first and the second patterns for a predetermined period of time according to a user command to synchronize the 3D TV 110 with the 3D glasses 120. The detecting unit 121 may also detect the first and the second patterns to synchronize the 3D TV 110 with the 3D glasses 120 at predetermined intervals.

The converting unit 122 converts the first pattern detected from the detecting unit 121 into a first histogram and the second pattern into a second histogram. That is, the converting unit 122 converts the optical properties of the first and the second patterns detected by the detecting unit 121 into the first histogram and the second histogram, respectively, which are digital signals.

The glasses driving unit 124 generates a driving signal based on a control signal received from the controller 123 which will be explained later. In particular, the glasses unit 125, which will be explained later, consists of a left eye glasses part 125-1 and a right eye glasses part 125-2 and thus, the glasses unit 125 generates a left eye glasses driving signal for driving the left eye glasses part 125-1 and a right eye glasses driving signal for driving the right eye glasses part 125-2, respectively, and transmits the generated left eye glasses driving signal to the left eye glasses part 125-1 and the generated right eye glasses driving signal to the right eye glasses part 125-2.

As described above, the glasses unit 125 comprises the left eye glasses part 125-1 and the right eye glasses part 125-2, and opens and closes each glasses part, or a shutter of each glasses part, according to the driving signal received from the glasses driving unit 124.

The storage unit 126 stores data needed to drive the 3D glasses 120. In particular, the storage unit 126 stores a first optimal histogram and a second optimal histogram into which the first and the second patterns are converted when the 3D glasses 120 are synchronized with the 3D TV 110.

The controller 123 controls the overall operation of the 3D glasses 120. In particular, the controller 123 generates a control signal based on the first and the second patterns received from the detecting unit 121 and controls the glasses driving unit 124 by transmitting the generated control signal to the glasses driving unit 124.

The method of the controller 123 for generating a control signal based on the first and second patterns will be explained with reference to FIGS. 4 and 5.

Figure 4:
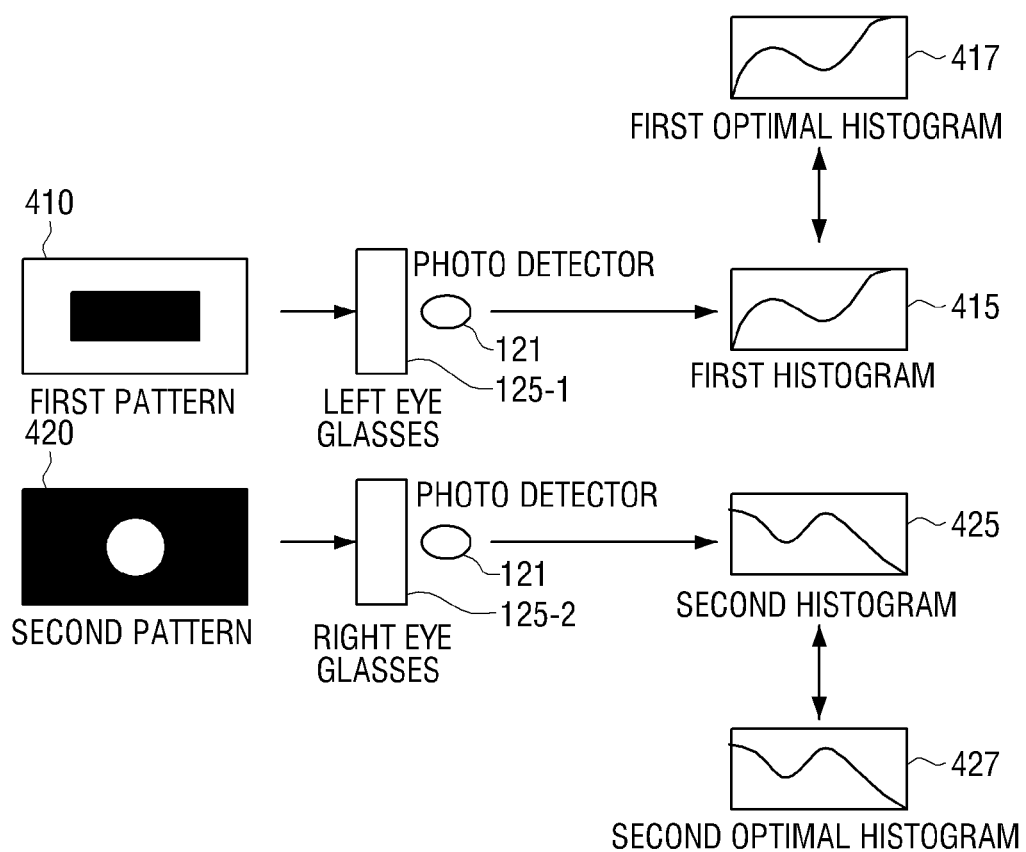
FIG. 4 is a view to explain a method for driving 3D glasses using a first pattern and a second patterns according to an exemplary embodiment.

FIG. 4 is a view to explain a method for driving 3D glasses using the first pattern and the second patterns according to an exemplary embodiment.

As illustrated in FIG. 4, the first pattern having a quadrangle shape and the second pattern having a circle shape, which are output from the 3D TV 110, are detected using the photo detectors 121 formed at the back of the left eye glasses part 125-1 and the right eye glasses part 125-2 respectively.

As described above, the detected first pattern 410 and the second pattern 420 are converted into the first histogram 415 and the second histogram 425 through by converting unit 122.

After the first pattern 410 and the second pattern 420 are converted, the controller 123 compares the converted first histogram 415 and the converted second histogram 425 with the first optimal histogram 417 and the second optimal histogram 427 pre-stored in the storage unit 126. In this case, the first optimal histogram 417 and the second optimal histogram 427 represent histograms to which the detected first and second patterns are converted when the 3D TV 110 and the 3D glasses 120 are synchronized with each other.

The controller 123 compares the converted first histogram 415 and the second histogram 425 with the first optimal histogram 417 and the second optional histogram 427, and if it is determined that the first histogram 415 and the second histogram 425 are consistent with the first optimal histogram 417 and the second optimal histogram 427, the controller 123 drives the glasses unit 125 to coordinate a timing of opening or closing of the 3D glasses 120 with the timing of the display of the first histogram 415 and the second histogram 425. In this case, the opening or closing timing of the 3D glasses 120 represents the time when the left eye glasses 125-1 and the right eye glasses 125-2 turned on or off, and the opening or closing duty of the 3D glasses 120 represents the time period during which the left eye glasses 125-1 and the right eye glasses 125-2 turned on or off.

On the other hand, if it is determined that the first histogram 415 and the second histogram 425 are not consistent with the first optimal histogram 417 and the second histogram 427, the controller 123 adjusts the timing of the opening or closing of the 3D glasses 120 by controlling the glasses driving unit 124. Specifically, the controller 123 controls the glasses driving unit 124 to adjust the timing or duty cycles of the opening or closing of the left eye glasses part 125-1 and the right eye glasses part 125-2 so as to bring the detected first histogram 415 and second histogram 425 into accordance with the optimal first histogram 417 and the optimal second histogram 427.

Figure 5:
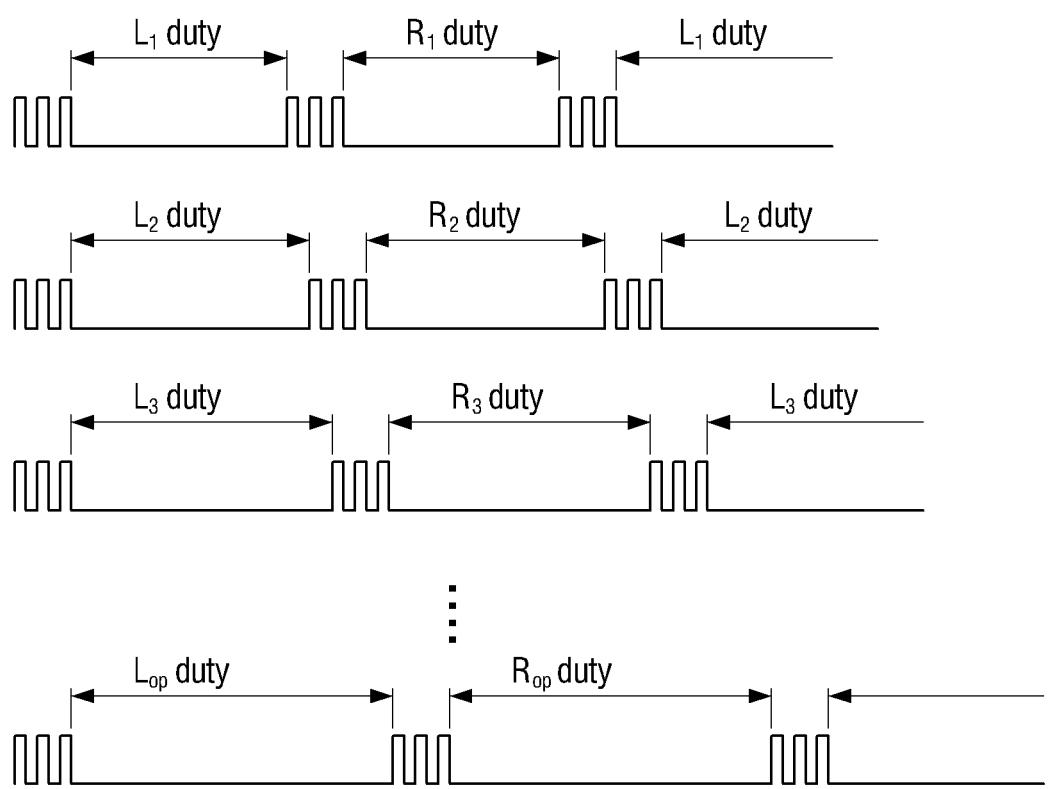
FIG. 5 is a view to explain the process of compensating a control signal for synchronizing 3D glasses according to an exemplary embodiment.

FIG. 5 is a view to explain the process of modifying a control signal for synchronizing the 3D glasses 120 according to an exemplary embodiment.

As illustrated in FIG. 5, the controller 123 drives the glass driving unit 124 using a control signal having duty cycles of $L_{1duty}$ and $R_{1duty}$. The controller 123 determines whether the detected first histogram and the second histogram are consistent with the first optimal histogram and the second optimal histogram using duty cycles of $L_{1duty}$ and $R_{1duty}$. If the detected first histogram and the second histogram are not consistent with the first optimal histogram and the second optimal histogram, the controller 123 drives the glasses driving unit 124 using a control signal having duty cycles of $L_{2duty}$ and $R_{2duty}$ which are longer duty cycles than $L_{1duty}$ and $R_{1duty}$. In this case, the controller 123 also determines whether the detected first histogram and the second histogram are consistent with the first optimal histogram and the second optimal histogram using the $L_{1duty}$ and $R_{1duty}$ duty cycles. The controller 123 adjusts the opening or closing duty cycles of a control signal applied to the glasses driving unit 124 using the above-mentioned method until the first histogram and the second histogram are consistent with the first optimal histogram and the second optimal histogram.

The opening or closing duty cycles of a control signal are adjusted using the above-mentioned method, and if the first histogram and the second histogram which are detected using $L_{OPduty}$ and $R_{OPduty}$ become consistent with the first optimal histogram and the second optimal histogram, the controller 123 continues to apply a control signal having $L_{1duty}$ and $R_{1duty}$ duty cycles to the glasses driving unit 124 to drive the glasses unit 125 of the 3D glasses 120.

In FIG. 5, a method for synchronizing the 3D TV 110 with the 3D glasses 120 by adjusting the opening or closing duty cycles of the 3D glasses 120 is described, but the 3D TV 100 and the 3D glasses 120 may also be synchronized by adjusting the opening or closing timing of the 3D glasses 120 in the similar manner.

As described above, the 3D glasses 120 may be synchronized with an image displayed on the 3D TV 110 without using a sync signal and thus, noises caused by a sync signal may be minimized.

Hereinafter, a method for driving the 3D glasses 120 without a sync signal will be explained with reference to FIG. 6.

FIG. 6 is a flowchart to explain a method for driving the 3D glasses 120 according to an exemplary embodiment.

First of all, the 3D glasses 120 detect the first pattern and the second pattern output from the 3D TV 110 using a photo detector (S610). In this case, the detected first pattern and the second pattern are synchronized with the left eye image and the right eye image of a 3D image to be displayed on the 3D TV 110, respectively, and have different geometric patterns from each other.

In particular, the 3D glasses 120 may detect the first pattern and the second pattern from the 3D TV 110 in at least one of the cases when the 3D TV 110 or the 3D glasses 120 are turned on, when a user command is input, and when a predetermined time period elapses. Specifically, the 3D glasses 120 may detect the first and the second patterns for a predetermined period of time before a 3D image is watched, or after the 3D TV 110 or the 3D glasses 120 are turned on. In addition, the 3D glasses 120 may detect the first and the second patterns for a predetermined period of time according to a user command to synchronize the 3D TV 110 with the 3D glasses 120. The 3D glasses 120 may also detect the first and the second patterns to synchronize the 3D TV 110 with the 3D glasses 120 at predetermined intervals.

After the first pattern and the second pattern are detected, the 3D glasses 120 convert the first pattern into a first histogram and the second pattern into a second histogram respectively (S620).

The 3D glasses 120 determine whether the converted first histogram and the converted second histogram are consistent with stored optimal histograms (S630). If it is determined that the first histogram and the second histogram are not consistent with the stored optimal histograms (S630-N), the 3D glasses 120 adjusts an opening or closing of the 3D glasses 120 (S640). Specifically, the glasses driving unit 124, of the 3D glasses, is controlled to adjust the opening or closing timing or the opening or closing duty cycles of the left eye glasses part 125-1 and the right eye glasses part 125-2 so as to bring the first histogram 415 and the second histogram 425 into accordance with the stored optimal histograms.

If the first histogram and the second histogram become consistent with the stored optimal histograms while the 3D glasses 120 is adjusting opening or closing of the 3D glasses 120 (S630-Y), the 3D glasses 120 are operated according to the opening or closing timing and the opening or closing duty cycle at the time at which the histograms become consistent.

According to the above method for driving the 3D glasses 120, the 3D glasses 120 may be synchronized with an image displayed on the 3D TV 110 without using a sync signal.

In the above exemplary embodiment, a 3D display apparatus is described as 3D TV 110, but this is only an example. The technical features described herein may be applied to other 3D display apparatuses. For example, a 3D display apparatus may be a 3D projector or a 3D monitor.

According to the above exemplary embodiments, 3D glasses may be synchronized with an image displayed on a 3D TV without using a sync signal and thus, noises caused by a sync signal may be minimized and operation of the glasses may be adjusted if necessary.

Although exemplary embodiments have been shown and described, it would be appreciated by those skilled in the art that changes may be made in these embodiments without departing from the principles and spirit of the inventive concept, the scope of which is defined in the claims and their equivalents.

What is claimed is:

1. A method for driving three-dimensional (3D) glasses, the method comprising:
    detecting a first pattern and a second pattern which are alternately displayed on a 3D display apparatus;
    converting the first pattern into a first histogram and converting the second pattern into a second histogram;
    comparing the converted first and second histograms with first and second predetermined histograms; and
    adjusting an opening and closing of a left eye glasses part and a right eye glasses part of the 3D glasses based on a result of the comparing,
    wherein the first pattern is a first geometric pattern and the second pattern is a second geometric pattern different from the first geometric pattern.

2. The method as claimed in claim 1, wherein the detecting comprises detecting the first pattern using a photo detector disposed in the left eye glasses part and detecting the second pattern using a photo detector disposed in the right eye glasses part of the 3D glasses.

3. The method as claimed in claim 1, wherein the detecting comprises detecting the first and the second patterns when the 3D display apparatus is turned on, when the 3D glasses are turned on, when a user command is received, and when a predetermined time period elapses.

4. The method as claimed in claim 1, wherein the first and second predetermined histograms are histograms measured when a display operation of a left eye image and a right eye image of the 3D display apparatus is synchronized with an opening or closing operation of the left eye glasses part and the right eye glasses part of the 3D glasses.

5. The method as claimed in claim 1, wherein the adjusting comprises adjusting at least one of an opening or a closing timing and an opening or a closing duty cycle of the 3D glasses until the first histogram and the second histogram are consistent with the first and second predetermined histograms.

6. The method as claimed in claim 1, further comprising:
    if the first histogram and the second histogram become consistent with the first and second predetermined histograms, driving the 3D glasses according to one of an opening or a closing timing and an opening or a closing duty cycle at a time at which the first and second histograms become consistent with the first and second predetermined histograms.

7. The method as claimed in claim 1, wherein converting the first and second patterns into the first and the second histograms comprises converting the detected first and second patterns into digital signals.

8. Three-dimensional (3D) glasses comprising:
    a detecting unit which detects a first pattern and a second pattern which are alternately displayed on a 3D display apparatus;
    a converting unit which converts the first pattern into a first histogram and converts the second pattern into a second histogram; and
    a controller which compares the converted first and second histograms with first and second predetermined histograms and adjusts an opening or a closing of a left eye glasses part and a right eye glasses part of the 3D glasses based on a result of the comparison,
    wherein the first pattern is a first geometric pattern and the second pattern is a second geometric pattern different from the first geometric pattern.

9. The 3D glasses as claimed in claim 8, wherein the detecting unit comprises a photo detector.

10. The 3D glasses as claimed in claim 8, wherein the detecting unit detects the first and the second patterns when the 3D display apparatus or the 3D glasses are turned on, when a user command is received, or when a predetermined time period elapses.

11. The 3D glasses as claimed in claim 8, wherein the first and second predetermined histograms are histograms measured when a display operation of a left eye image and a right eye image of the 3D display apparatus is synchronized with an opening or a closing operation of the left eye glasses part and the right eye glasses part of the 3D glasses.

12. The 3D glasses as claimed in claim 8, wherein the controller adjusts at least one of an opening or a closing timing and an opening or a closing duty cycle of the 3D glasses unit until the first histogram and the second histogram are consistent with the first and second predetermined histograms.

13. The 3D glasses as claimed in claim 8, wherein, if the first histogram and the second histogram become consistent with the first and second predetermined histograms, the controller drives the 3D glasses according to one of an opening or a closing timing and an opening or a closing duty cycle at a time at which the first and second histograms become consistent with the first and second predetermined histograms.

14. The 3D glasses as claimed in claim 8, wherein the converting unit converts the first and second patterns into the first and the second histograms by converting the detected first and second patterns into digital signals.

15. A system for providing a three-dimensional (3D) image, the system comprising:
   a 3D display apparatus which alternately displays a first pattern and a second pattern; and
   3D glasses which detect the first and the second patterns displayed on the 3D display apparatus, convert the first pattern into a first histogram and the second pattern into a second histogram, compare the converted first and second histograms with first and second predetermined histograms, and adjust an opening or a closing of a left eye glasses part and a right eye glasses part of the 3D glasses based on a result of the comparison,
   wherein the first pattern is a first geometric pattern and the second pattern is a second geometric pattern different from the first geometric pattern.

\* \* \* \* \*